Feb. 2, 1937.  L. MAURIZI  2,069,617
HAND GRILL
Filed July 28, 1936
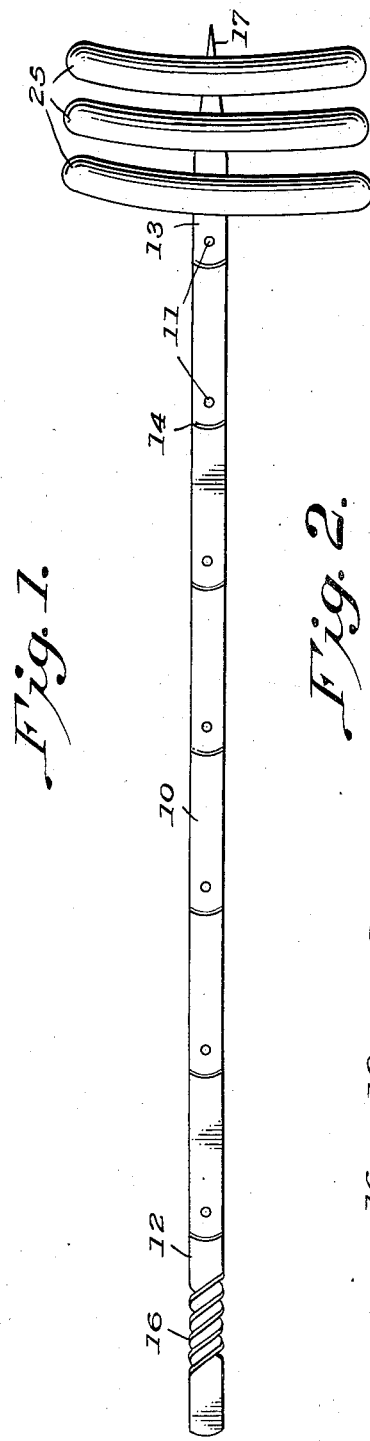
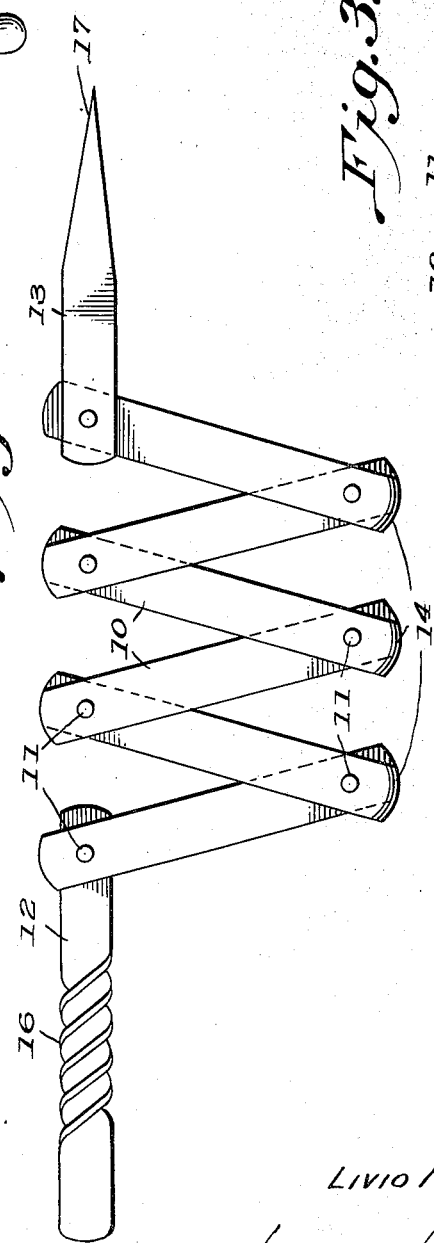
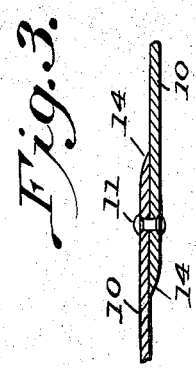
Inventor
LIVIO MAURIZI

UNITED STATES PATENT OFFICE 2,069,617

HAND GRILL

Livio Maurizi, Trenton, N. J.

Application July 28, 1936, Serial No. 93,105

1 Claim. (Cl. 294—61)

This invention relates to a hand grill designed for the roasting of sausages and like food articles.

It is the object of my invention to provide a hand grill, the effective length of which may be adjusted in accordance with specific requirements.

It is a further object of my invention to provide a hand grill which is compact and which may be collapsed to occupy a small space, lending itself well as an implement or accessory for camping and traveling.

It is a further object of my invention to provide a hand grill which is rugged in construction, economical to produce and easy to keep clean.

Other objects and purposes will appear from a more detailed description of the invention taken in conjunction with the accompanying drawing wherein, Fig. 1 is a front elevation of a hand grill in accordance with my invention shown in fully extended position with three sausages impaled thereby in position for roasting, Fig. 2 is a front elevation of the hand grill in an intermediate position, and Fig. 3 is a horizontal longitudinal sectional view of one of the joints in Figure 1.

In the drawing is shown a hand grill made up of a plurality of flat metallic bars 10 of any suitable number depending upon the desired maximum length of the assembly. These bars 10 may be of galvanized iron of about ⅜ inch width, 1/16 inch thickness and of about 6 inches length. In the illustrated embodiment seven of such members are formed in a unit which is adequate for most purposes.

The adjacent ends of juxtaposed bars may be joined for pivotal movement by rivets 11 or, if desired, by bolts and nuts. This fastening means between the adjacent bars is arranged to permit an angular adjustment between the bar members by the application of force but is sufficiently tight to retain the parts in their adjusted positions. Whereas the grill is shown in Fig. 1 in its fully extended position, it is shown in an intermediate position in Fig. 2 and it may be collapsed completely for convenient storage.

At one end of the series of bars 10 is provided a bar 12 which may be twisted at 16 to form a handle portion to render easy the turning of the grill. Any desired handle of wood or other material may be substituted for the handle shown in the illustrated embodiment. At the opposite end of the series of bars is provided a member 13 which is preferably pointed, as at 17, for the purpose of facilitating the piercing of food articles such as sausages, chops, bread, and the like for roasting and analogous operations.

In Fig. 1, three sausages 25 are shown mounted upon the grill in position for roasting. In order to render easy the mounting of any desired number of such articles, the ends of the members 10 are tapered as at 14 (Fig. 3), to facilitate the passage of the food articles over the junction points of the bars. Although this expedient may be adopted for all of the articulated joints of the assembly, it is of particular advantage when it is applied to the first few joints adjacent the pointed end which receives the articles for roasting.

It is evident from the above explanation that a ruggedly constructed grill of adjustable length is attained by the arrangement disclosed herein.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claim.

What I claim is:

In a device of the class described, a series of flat metallic bars pivotally joined together end to end comprising a pointed bar at one end of the series adapted to impale food articles, fastening means comprising rivets for joining adjacent bars with sufficient tighteness to effect a self-sustaining assembly while permitting adjustment thereof to vary the length of the assembly, and tapered ends on said metallic bars at said rivets for permitting the easy passage of the food articles thereover.

LIVIO MAURIZI.